United States Patent [19]

Bayer

[11] Patent Number: 4,553,165
[45] Date of Patent: Nov. 12, 1985

[54] TRANSFORM PROCESSING METHOD FOR REDUCING NOISE IN AN IMAGE

[75] Inventor: Bryce E. Bayer, Rochester, N.Y.

[73] Assignee: Eastman Kodak Company, Rochester, N.Y.

[21] Appl. No.: 522,284

[22] Filed: Aug. 11, 1983

[51] Int. Cl.[4] .......................... H04N 1/40; H04N 5/14
[52] U.S. Cl. .................................... 358/167; 358/284; 358/166; 364/727
[58] Field of Search .............. 358/166, 167, 284, 133, 358/113, 138, 260; 382/43; 364/727

[56] References Cited

U.S. PATENT DOCUMENTS

| | | | |
|---|---|---|---|
| 4,055,756 | 10/1977 | Jolivet | 364/725 |
| 4,179,709 | 12/1979 | Workman | 358/133 |
| 4,242,705 | 12/1980 | Ebihara | 358/167 |
| 4,442,454 | 4/1984 | Powell | 358/167 |

OTHER PUBLICATIONS

Computer Vision Graphics and Image Processing, vol. 23, No. 1, Jul. 1983, Chin and Yeh: "Quantitative Evaluation of Some Edge-Preserving Noise-Smoothing Techniques," pp. 67-90, see paragraph 2D.
Pattern Recognition, vol. 12, No. 6, 1980, Scher and Rosenfeld: "Probability Transforms of Digital Pictures", pp. 457-468, see paragraph 3.
"Bandwidth Compression of Noisy Images," by B. P. Agrawal and V. K. Jain, Computer and Electronic Engineering, vol. 2, 1975, pp. 275-284.
"Application of Orthogonal Transforms in the Enhancement of Images in the Presence of Additive Noise," by H. R. Keshavan et al., Computer and Electronic Engineering, vol. 4, 1977, pp. 279-295.
"Transform Picture Coding," by P. A. Wintz, Proceedings of the IEEE, vol. 60, No. 7, Jul. 1972, pp. 809-820.
"Digital Techniques of Reducing Television Noise," by J. P. Rossi, Journal of the Society of Motion Picture and Television Engineers, Mar. 1978, pp. 134-140.

Primary Examiner—John C. Martin
Assistant Examiner—E. Anne Toth
Attorney, Agent, or Firm—David M. Woods

[57] ABSTRACT

An improved image processing method reduces noise in a sampled image while minimizing unintended distortion of image features. Image signals are generated representative of the light value of elements of the image. These signals are formed into signal arrays aligned to blocks of image elements. The signal arrays are transformed by a set of 4 by 4 Walsh-Hadamard functions into a corresponding set of coefficient signals. Certain of these coefficient signals represent the difference between the light value of each image element and an average light value over an image region smaller than the block being transformed. By modifying—i.e., coring or clipping—and inverting only these selected coefficient signals, artifacts related to the introduction of "false" edge-like structure are reduced in the reconstructed image. In addition, in a multi-stage processing method, the excluded coefficient signals may represent the input signals to the next stage.

21 Claims, 20 Drawing Figures

A. FIRST
   STAGE

```
p o n m
l k j i
h g f e
d c b a
```

B. SECOND
   STAGE

```
p - o - n - m -
- - - - - - - -
l - k - j - i -
- - - - - - - -
h - g - f - e -
- - - - - - - -
d - c - b - a -
- - - - - - - -
```

C. THIRD
   STAGE

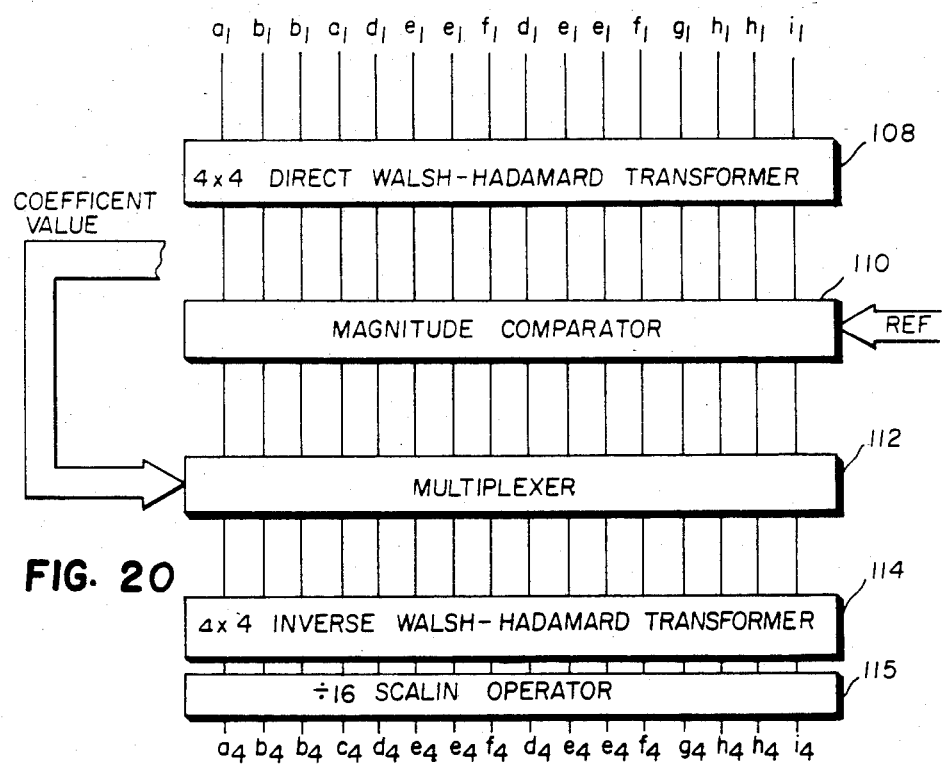

TRANSFORM PROCESSING METHOD FOR REDUCING NOISE IN AN IMAGE

BACKGROUND OF THE INVENTION

1. Field of the Invention

The invention relates to image processing methods for reducing noise in a sampled image. More specifically, the invention pertains to an image processing method which reduces noise while minimizing unintended distortion of image features.

2. Description Relative to the Prior Art

Pictures generated by an image processing method often display artifacts introduced by the processing method itself. Such artifacts may mask the benefits obtained by processing the image. This invention pertains to the suppression of a particular class of artifacts: the introduction of what appear to be "edges" into places—like smooth facial features—where no such edges existed in the original image. To better describe the invention it is necessary to review certain aspects of known image processing technology.

In known image processing methods, every image signal is replaced by a modified value, based on the values of the image signals from a surrounding field of image elements. The signals from the surrounding field are used to form a number of different linear combinations each of which represents a different component of the image structure within the field. In a typical method, most of the combinations represent the detail within the field. Each detail-sensitive combination represents a difference among local image signals and tends to vanish in the absence of a particular kind of image detail. Noise is reduced by modifying the detailsensitive combinations such that, for example, the value of a combination is lowered or set to zero wherever a particular kind of image detail is not present.

One kind of method for reducing noise is based on transformation of the image. Such a method may use—for the surrounding field of image elements—the signals from all of the image elements constituting the image, as described by Agrawal and Jain (in "Bandwidth Compression of Noisy Images," *Computer and Electronic Engineering,* Vol. 2, 1975, pp. 275–284) and Keshavan et al. (in "Application of Orthogonal Transforms in the Enhancement of Images in the Presence of Additive Noise," *Computer and Electronic Engineering,* Vol. 4, 1977, pp. 279–295). For a typical image, such a transformation carries out direct and inverse transform computations on a large array of data. It is also known to divide the image into adjacent sub-images or blocks of image elements in order to facilitate processing. (See "Transform Picture Coding," by P. A. Wintz, *Proceedings of the IEEE,* Vol. 60, No. 7, July 1972, pp. 809–820.) Processing each block independently reduces the computation load and the problem of managing large arrays of data.

In a transformation method, each block of image elements is treated as a superposition of a number of predetermined, basic patterns. These patterns are derived from a set of independent functions characteristic of the transform. Each pattern is numerically weighted by a factor (hereinafter called a transform coefficient signal) calculated from a linear combination of the image signals. The magnitude of each transform coefficient signal determines the contribution of the corresponding pattern to the total sub-image or block. The transform coefficient signals of all of these patterns—for all the blocks—thus constitute the original image in its transformed condition. The image (in its original condition) may be recovered by replacing the image signal of each element by a particular linear combination of the transform coefficient signals.

Numerous known transforms may be used in a transformation method for reducing noise, including (but not to be limited to) the Fourier, cosine, sine, Walsh-Hadamard, Haar, slant or Karhunen-Loeve transforms. These transforms are conventional and well known to those of ordinary skill in this art. For further information, reference is made to *Digital Image Processing* by W. K. Pratt (John Wiley & Sons, New York, 1978) and especially chapter 10 thereof, "Two-Dimensional Unitary Transforms" and the bibliographic references cited therein. Much of the description accompanying the present patent specification is with reference to the Walsh-Hadamard transform, which is particularly useful because of its simplicity of application to digital design.

As an example of a transformation, FIG. 1 shows the predetermined Walsh-Hadamard patterns which, superimposed in weighted combination, represent the light values of any 2 by 2 field of the original image. (Light value, as used throughout this patent application, shall mean any image-related characteristic—e.g., lightness, brightness, density, hue, and the like—that can be expressed in a form suitable for image processing.) Each pattern has four square elements, which may either be black or white. The weight of each pattern corresponds to the relative presence of that pattern in a particular 2 by 2 field of the original image. For example, if the light values of a 2 by 2 field of image elements are represented as a matrix of four image signals $a_{ij}$, $$\begin{bmatrix} a_{11} & a_{12} \\ a_{21} & a_{22} \end{bmatrix}$$

and the weighting factors for the Walsh-Hadamard Patterns are represented as a matrix of four coefficient signals $c_{ij}$, $$\begin{bmatrix} c_{11} & c_{12} \\ c_{21} & c_{22} \end{bmatrix}$$

then these coefficient signals are generated from the image signals in four arithmetic operations, as follows.

$$c_{11} = a_{11} + a_{12} + a_{21} + a_{22}$$

$$c_{12} = a_{11} - a_{12} + a_{21} - a_{22}$$

$$c_{21} = a_{11} + a_{12} - a_{21} - a_{22}$$

$$c_{22} = a_{11} - a_{12} - a_{21} + a_{22}$$

By inspecting the patterns in FIG. 1 with reference to these arithmetic operations, it can be seen that these operations correspond to having each black square represent a multiplication by $+1$ on the signal from a corresponding image element and each white square represent a multiplication by $-1$. In this connection, FIG. 2 is an abbreviated way of listing the arithmetic operations necessary to generate the linear combinations constituting the matrix of coefficient signals $c_{ij}$.

The ±1 multipliers mentioned above are grouped into arrays of four multipliers, each corresponding in position to the image element, and signal, they operate upon. Four arrays are provided corresponding to the four arithmetic operations mentioned above for generating the four coefficient signals. The array composed of four +1 multipliers generates an average signal (the $c_{11}$ coefficient signal) over the 2 by 2 area. The other three arrays generate difference signals in response to differences in light value between image elements. These differences represent image gradients among image elements within the 2 by 2 area; in terms of the arithmetic operations for generating them, they are a function of one zero crossing along horizontal and/or vertical directions, i.e., no more than one transition from positive to negative (+1 to −1) or vice versa (−1 to +1). Such signals are hereinafter referred to as first difference signals. Noise is reduced by subjecting each of the first difference coefficient signals to a modification process.

The coefficient modification process typically involves either coring or clipping. Coring is a non-linear noise reduction process that removes signal energy—presumably noise—near the average signal axis and less than a threshold; the remaining signal is then added back to the low-pass signal represented by the average coefficient signal. (See "Digital Techniques of Reducing Television Noise," by J. P. Rossi, *Journal of the Society of Motion Picture and Television Engineers,* March 1978, pp. 134–140.) Clipping is a complementary process that removes signal energy—presumably image detail—that is above a threshold; the remaining noise signal is then subtracted from the fullband image signal.

A regenerated, processed image of reduced noise is obtained by inverse transforming the coefficient signals, some of which may have been modified in the preceding noise reduction process. Since the Walsh-Hadamard transform is exactly invertible, the four image signals $a_{ij}$ can be recovered by employing the four operations represented in FIG. 2, but now with respect to the coefficient signals, as follows.

$$a_{11} = \tfrac{1}{4}(c_{11} + c_{12} + c_{21} + c_{22})$$

$$a_{12} = \tfrac{1}{4}(c_{11} - c_{12} + c_{21} - c_{22})$$

$$a_{21} = \tfrac{1}{4}(c_{11} + c_{12} - c_{21} - c_{22})$$

$$a_{22} = \tfrac{1}{4}(c_{11} - c_{12} - c_{21} + c_{22})$$

In transforming a picture divided into blocks, the determination of the block size is a function of the spatial scale of the detail to be processed. Small blocks are appropriate for high frequency (fine) detail, larger blocks for lower frequency (coarser) detail, and so on. The selection of the block size also affects the noise frequencies that are removed. If the block size is small, noise components of low spatial frequency will remain unchanged after modification of the coefficient signals and may result in a residual mottled appearance. A large block, containing a relatively large number of elements, is needed to suppress mottle. However, using only a large block not only increases the computation load, but also degrades high-frequency detail that is confined to a small area within the block. For these reasons, it is advantageous to process the image with several block sizes in a hierarchy of stages.

Commonly assigned, copending patent application Ser. No. 441,826 (entitled "Image Processing Method Using a Block Overlap Transformation Procedure," filed Nov. 15, 1982), describes a transform processing method that operates in a hierarchy of stages, each stage employing a different-sized block operating on image signals derived from a preceding stage. Each stage responds to image gradients related to the size of the block used in that stage. A small block, corresponding to a few elements of the image, detects gradients over a small image area, i.e., local image gradients. A larger block, corresponding to a relatively larger number of elements, detects gradients over a larger area, i.e., extended image gradients. In each stage, part of the original image signal is regenerated as a function of the difference between the light value of each image element and an average light value over the immediate area (i.e., the block) including that element. By additionally overlapping the blocks processed in each stage, the processed signal from each image element is the linear combination of many transform coefficient signals from each stage and from each overlapped block within each stage. Such a large number of contributions making up each processed image element assures that the processed image is generated without a characteristic block-like structure due to block transform processing.

Since the noise reduction process involves the application of a non-linear function (e.g., a threshold), some distortion of local image values may be generated as an artifact of the noise processing itself, but this is often tolerated in order to realize the desired noise reduction. Some of this distortion—that having to do with a block-like structure—is reduced by the block overlap procedure described in the heretofore cited Ser. No. 441,826. However, other distortion—like that related to the introduction of "edges"—is not adequately treated by the block overlap procedure. The problem with a block transform method—like that described in Ser. No. 441,826—is that any first difference coefficient signal capable of representing a block-wide gradient is similarly representative of segments of more extended gradients. For example, a coefficient signal generated from a block covering only a few image elements not only responds to the change of a local gradient, e.g., a low contrast edge, but also responds to a gradual change in a smooth, extended image gradient—such as is frequently found within smooth areas of scene objects. A local gradient and an extended gradient may thus look the same to a coefficient-generating operation that is coextensive with the local field of a small block. The "false edge" artifact arises when a threshold set up to distinguish low contrast detail in a local field is "falsely" triggered by a smooth, extended gradient.

The non-linear coring (or clipping) procedure is in part justified by the assumption that transition between the cored and non-cored (or clipped and non-clipped) states is mostly acceptable in a "busy" region of the image, as at an edge. The problem arises where the local and extended gradients appear the same, that is, in certain less "busy" regions of an image where the light value is changing only smoothly and slowly. In such regions the value of one or more of the detail-sensitive linear combinations derived from the smaller block will pass through its noise threshold. Because this situation activates the coring (or clipping) procedure, an abrupt discontinuity will undesirably appear in the processed image at the point where the threshold is crossed and the corresponding linear combination is undesirably modified. In less "busy" regions—like the smoothed area of an extended gradient—this transition sometimes leads to a visible artifact—much like an "edge"—and therefore is undesirable. From an aesthetic viewpoint, such artifacts particularly detract from the overall visual appeal of images reproduced by such methods. In fact, in some areas of an image such transitions may be more objectionable than the original noise component that the coefficient modification process has removed. Transform methods of which I am aware are unable to effectively deal with these types of artifacts, therefore yielding aesthetically unappealing results. My invention provides a solution for this type of problem.

SUMMARY OF THE INVENTION

In arriving at my invention, I have found it helpful to look upon the technique of image transformation as a technique for generating a processed image signal as a function of the difference between the light value of an image element and a smoothed light value over an area surrounding the element. The size of this area ordinarily corresponds to the spatial scale of the detail being processed for noise reduction—i.e., a small area for fine detail, a larger area for coarser detail, and so on. The transform block is then selected to demarcate this area. This may be done in several stages on correspondingly larger blocks and the partial results from each stage are combined. However, the "false edge" artifact is observed in the final result.

I have found that the "false edge" artifact largely disappears if I generate the processed image signal as a function of many localized comparisons among image elements arrayed over an enlarged area. This is done by using a larger transform block in which these comparisons are expressed in terms of the coefficient signals generated by the transformation. Nonetheless, it is still necessary—if the method is to preserve the same scale of detail as before—to finally generate an image signal that is a function of the light value difference between an image element and the smaller area including the desired scale of detail. I am able to meet both requirements by using a block transform that operates on an enlarged area. From the coefficient signals generated by such an enlarged block transform, I then select for processing a subset of coefficient signals which—when inverted—constitute the difference between the light value of an image element and a smoothed light value over the smaller area including the desired scale of detail. The coefficient signals not selected are predominantly sensitive to block-wide image gradients. Many of the selected coefficient signals that remain in the transformation represent multiple comparisons among many local image gradients collected over the enlarged area of the block being transformed. These coefficient signals are more effective in distinguishing low contrast detail from a smooth, extended gradient and thereby avoid the "false edge" artifact while preserving sensitivity to the desired detail.

The invention thus pertains to a transformbased method of image processing which operates on a selected group of transform coefficient signals. Initially, image signals are generated that are representative of the light value of elements of the image. These signals are formed into arrays of signals, with each array aligned to a group of image elements. Then each array of image signals is transformed by a set of independent functions-dependent upon the particular transform being used—into a set of coefficient signals corresponding to combinations of image signals representative of differences in light value between image elements within the group. A subset of these coefficient signals represents—when inverted—differences between the light value of each image element and a smoothed light value over an image region smaller than the group of image elements being transformed. This subset is selected out of all the coefficient signals and modified so as to reduce noise in the processed image. A processed image of reduced noise is then generated from the modified subset of coefficient signals.

The preferred type of transformation is the Walsh-Hadamard transform. The selected subset of coefficient signals is assembled by process of elimination by excluding a subset of coefficient signals that represent first order differences between image signals, that is, signals calculated from weighting arrays with no more than one zero crossing along vertical or horizontal directions. The remaining coefficient signals, forming the selected subset, are predominantly second, or higher order, differences.

The application of this method in connection with an image having both gradual, extended gradients and low-contrast local gradients (e.g., low-contrast edges) prevents unwanted processing artifacts—such as "false edges"—from degrading the reproduction of such portions of the image.

BRIEF DESCRIPTION OF THE DRAWINGS

The invention will be described with reference to the figures, wherein:

FIG. 4 shows the arrays of coefficient weights corresponding to the patterns of FIG. 3;

FIGS. 6A, 6B and 6C are diagrams illustrating the particular image element locations selected for transformation at each stage of the method in accordance with the embodiment of FIG. 5;

FIG. 17 shows an array of coefficient weights suitable for implementing a modified Walsh-Hadamard transform on a 3 by 3 array of image elements in accordance with a second embodiment of the invention;

FIGS. 19A, 19B and 19C are diagrams illustrating the particular image element locations selected for transformation at each stage in accordance with the modified Walsh-Hadamard transform; and FIG. 20 is a circuit diagram of the Walsh-Hadamard processor incorporated in FIG. 18.

DETAILED DESCRIPTION OF THE PREFERRED EMBODIMENTS

The input signal in the following description is generated by the scanning and sampling of an original image. For purposes of describing the preferred embodiments the input signal is assumed to be generated from an image such as a negative or positive photographic transparency. It is further understood that such a signal may represent a variety of spatial components of the image, including an average light value, fine detail such as fine edges, lines and textures; intermediate detail such as broader edges and small features; and coarse detail such as shaded modeling and other gradually varying features. (Modeling as here used refers to the rendition of smoothly varying features or details.) In addition, the signal includes a noise component affecting most of the spatial components to some degree. With a photographic transparency, much of such noise originates with the random distribution of the light-absorbing particles that form the basis of this image-recording system. While the invention will be described in connection with sampled data from a photographic transparency, it should be understood that the input signal can represent other information or data, such as would be derived from directly scanning an object, from a composite video signal, or from image information in optical/electrical/magnetic storage. In such cases the noise originates in other characteristics of the signal generating system.

Figure 1:
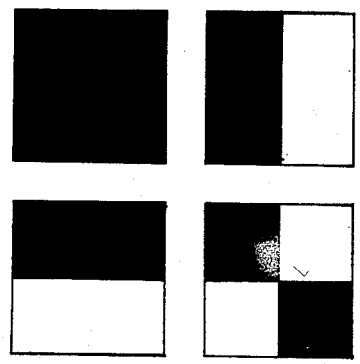
FIG. 1 shows the Walsh-Hadamard patterns associated with a 2 by 2 field of the original image.
Figure 2:
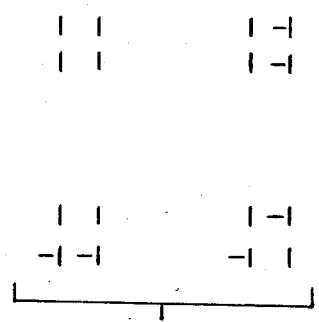
FIG. 2 shows the arrays of coefficient weights corresponding to the patterns of FIG. 1.
Figure 3:
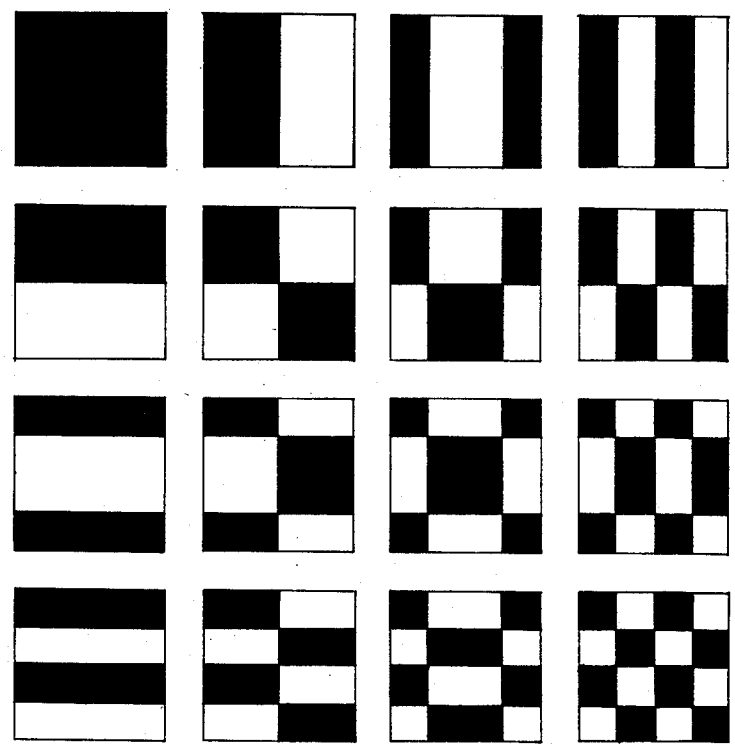
FIG. 3 shows the Walsh-Hadamard patterns associated with a 4 by 4 field of the original image.

The invention will be described in connection with a 4 by 4 Walsh-Hadamard transformation. Apart from involving a larger field of image elements and therefore involving a greater number of linear combinations, the operation of the 4 by 4 Walsh-Hadamard transform is analogous to that of the aforedescribed 2 by 2 Walsh-Hadamard transform. FIG. 3 shows the predetermined Walsh-Hadamard patterns which, superimposed in weighted combination, represent any 4 by 4 field of the original image. The 4 by 4 field of image elements is represented as a matrix of sixteen image signals $a_{ij}$, $$\begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix}$$

and the weighting factors for the sixteen Walsh-Hadamard patterns of FIG. 3 are represented as a matrix of sixteen coefficient signals $c_{ij}$, as follows.

$$\begin{bmatrix} c_{11} & c_{12} & c_{13} & c_{14} \\ c_{21} & c_{22} & c_{23} & c_{24} \\ c_{31} & c_{32} & c_{33} & c_{34} \\ c_{41} & c_{42} & c_{43} & c_{44} \end{bmatrix}$$

Figure 4:
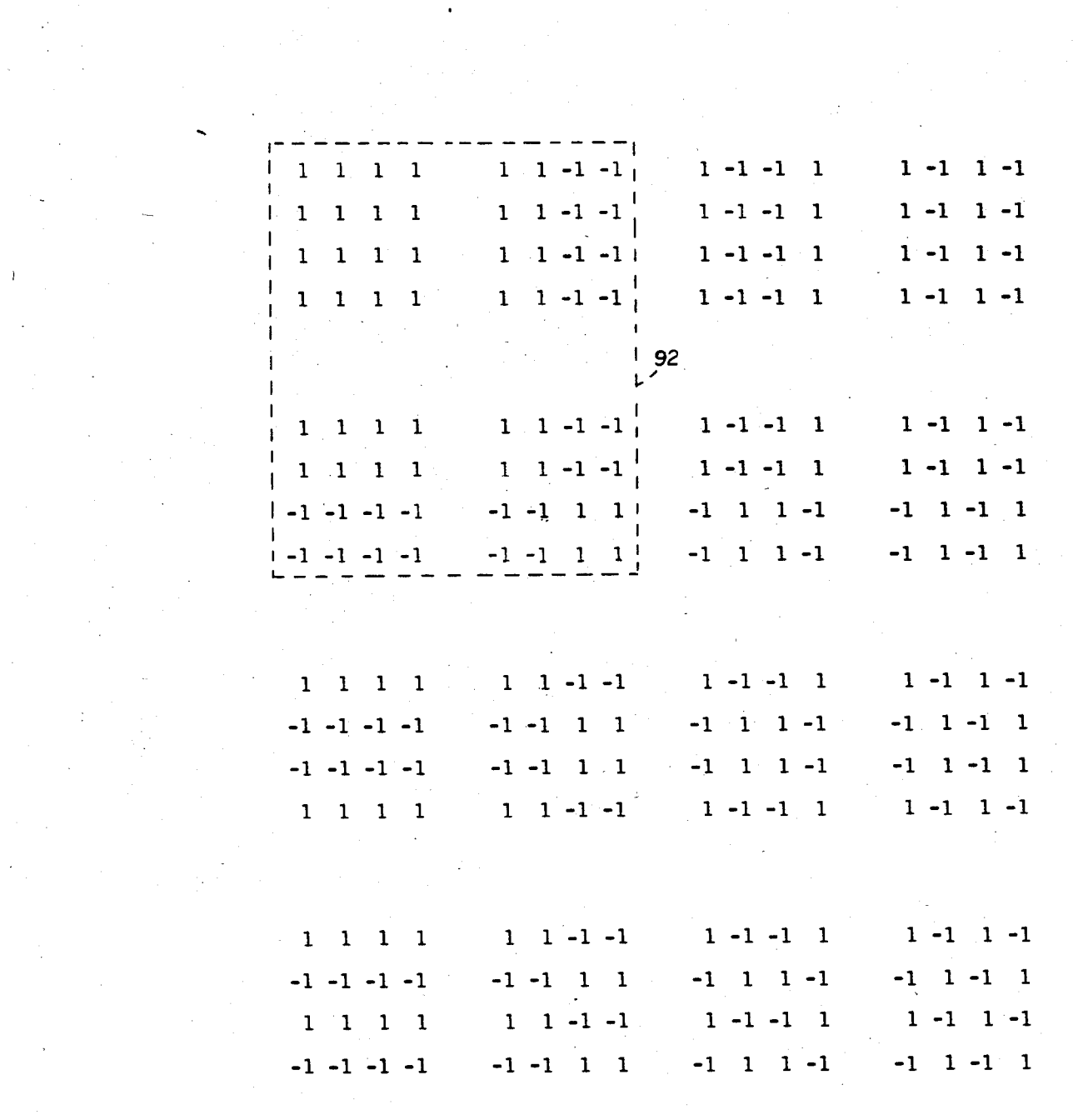

FIG. 4 is a list of the sixteen arrays of ±1 multipliers used in the sixteen arithmetic operations for generating the corresponding sixteen coefficient signals $c_{ij}$. As with the 2 by 2 transform, each pattern in FIG. 3 is numerically weighted in accordance with a corresponding transform coefficient signal $c_{ij}$ generated by the application of the corresponding coefficient operation represented in FIG. 4. Apart from the average coefficient signal $c_{11}$, each coefficient signal is generated from light value differences between image elements within the 4 by 4 area. Some of the coefficient signals, e.g., signals $c_{12}$, $c_{21}$ and $c_{22}$, are a function of no more than one zero crossing along the horizontal or vertical directions. These are first order difference signals. Other coefficient signals are a function of multiple zero crossings and represent second (or higher) order difference signals.

Figure 5:
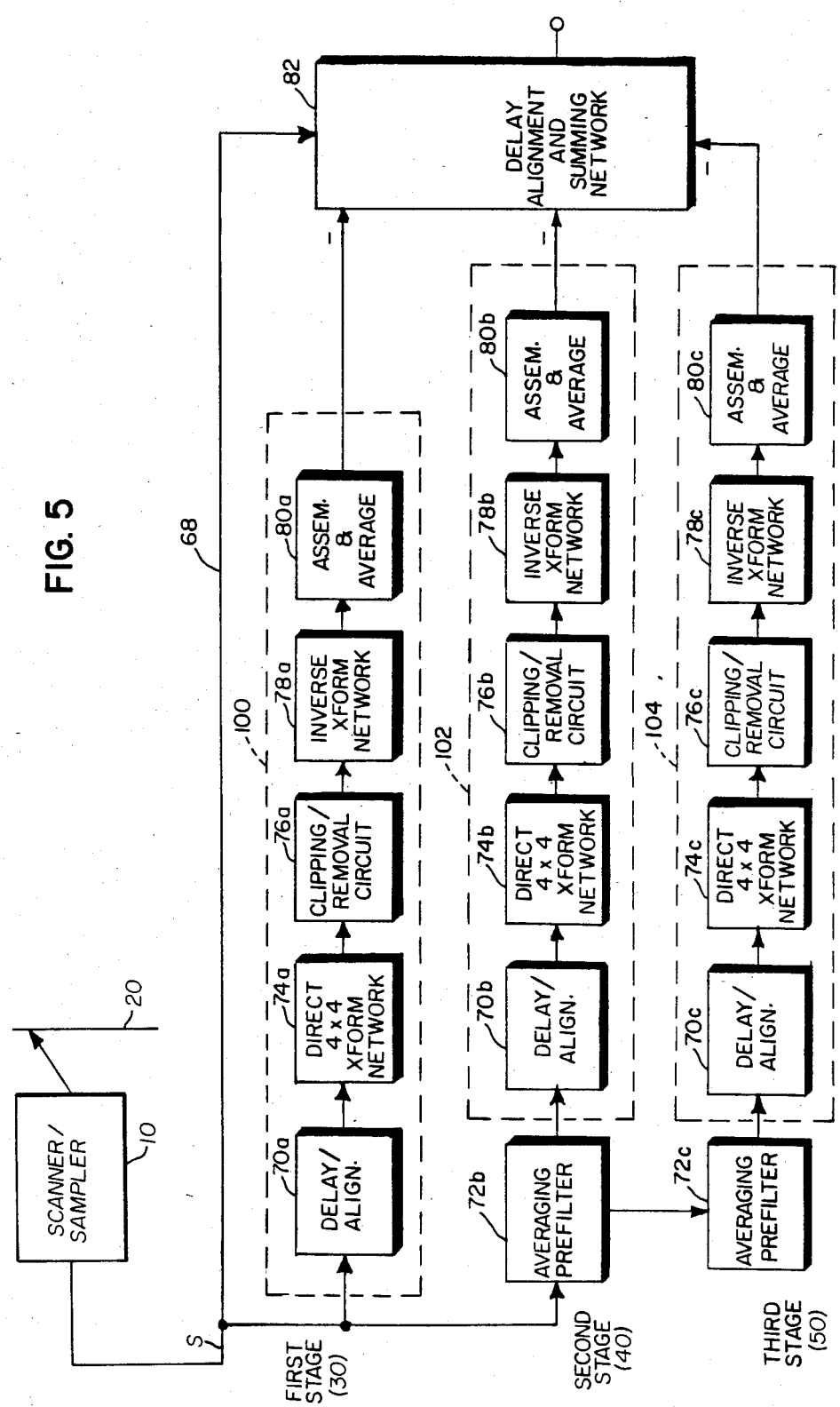
FIG. 5 is a block diagram of an image processing method in accordance with a first embodiment of the invention.

FIG. 5 is a block diagram of a three-stage transform processing method in accordance with the invention. The general configuration shown in FIG. 5 pertains to the type of process described in the aforementioned patent application Ser. No. 441,826. Parts of the process relating to the direct and inverse transformation and coefficient modification are shown in accordance with the present invention. Conventional scanning and sampling apparatus 10 generates a stream of image signals by scanning a photographic negative 20. Each signal relates to the light value of a respective element of an original image on the negative 20. This signal stream, hereinafter called signal stream S, is processed through three stages. Each stage conveys signals sensitive to particular spatial components of the image: a first stage 30 conveys fine detail signals, a second stage 40 conveys intermediate detail signals and a third stage 50 conveys coarse detail signals. Noise signals, due to photographic grain, are distributed across all stages. The spatial scale of the noise signals in each stage corresponds to the spatial scale of the corresponding detail.

Figure 7:
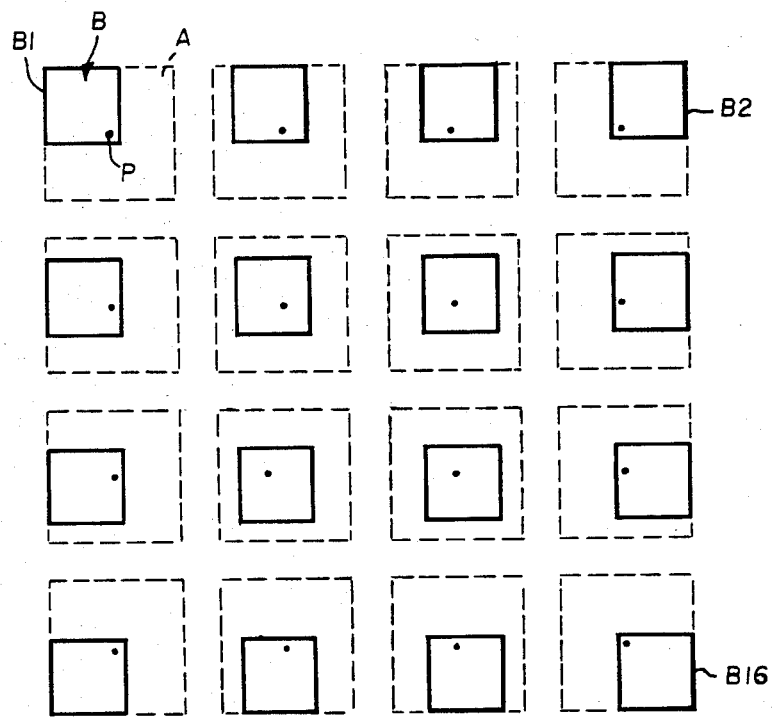
FIGS. 7A and 7B are diagrams of the weighting arrays used for the prefilters of FIG. 5.

The 4 by 4 Walsh-Hadamard transform is used in each of the three stages shown in FIG. 5. Since each stage processes differently scaled detail and the same number of transform coefficient signals are available in each stage, the image signals generated for each stage after the first should be filtered or processed versions of either the original image signals or those signals processed in some proceding stage. For that purpose, suitably low-pass prefiltered image signals related to the average light value of areas of the original image are provided in the second and third stages by use of averaging prefilters 72b and 72c. In the averaging prefilter 72b each image signal of the original image is replaced by an average over a neighborhood of the original image signal in accordance with the weighting pattern of FIG. 7A. In the averaging prefilter 72c, each of the once-averaged image signals is replaced by an average over the larger neighborhood of once-averaged signals as indicated by the pattern of FIG. 7B (in each case, the signal being replaced corresponding to the center weight of 4).

Although sixteen image signals are being transformed at one time in each stage, the spatial relationship of the corresponding image elements processed by the Walsh-Hadamard transform, i.e., whether they are adjacent or separated by intervening image elements, will depend on which stage is involved. FIG. 6 illustrates the particular image element locations selected for the Walsh-Hadamard transformation at each stage. The letters a–p represent the locations of the image array elements selected to form the 4 by 4 transformation blocks at each stage (corresponding to the image signals $a_{ij}$ as heretofore discussed), while the dashes represent image elements that do not provide inputs to the respective calculation.

In each stage, the continuous stream of such signal arrays effects a shifting of block boundary locations between successive blocks so as to cause block/block overlap. If the block/block overlap amounts to a shift of a single image element from the previous block, the selection of sixteen image signals for transformation at each stage means that each image signal in each stage contributes to the transformation of sixteen arrays of image signals. (More information regarding a block overlap transformation procedure is found in copending Ser. No. 441,826.) However, since each image signal in any stage after the first is a filtered version of some preceding image signal, the sixteen image element locations selected for transformation in such stages already include contributions from neighboring locations due to the filtering process.

Referring again to FIG. 5, the stream of image signals S is directly presented to a delay and alignment network 70a in the first stage and to the averaging prefilter 72b in the second stage; from the second stage the once-averaged image signals are presented to the averaging prefilter 72c. In addition, the stream of signals S bypass all stages on a line 68. In the first stage 30, the delay and alignment network 70a presents an array of image signals to a transform network 74a for Walsh-Hadamard transformation. The stream of once-averaged image signals from the prefilter 72b is applied to a delay and alignment network 70b in the second stage 40, which presents an array of once-averaged image signals to a transform network 74b for Walsh-Hadamard transformation. The stream of twice-averaged image signals from the prefilter 72c is applied to a third delay and alignment network 70c, which presents an array of twice-averaged image signals to a transform network 74c for transformation in the third stage 50.

Each delay and alignment stage 70a, 70b and 70c is so configured as to present an array of particular image signals that are selected (in accordance with the locations a–p of FIG. 6) for the 4 by 4 Walsh-Hadamard transformation at each stage. That is, in the second stage 40, the 4 by 4 transform operates on sixteen signals taken from next adjacent signals of next adjacent rows of the once-averaged signals presented by one alignment of the incoming stream of signals. In the third stage 50, the 4 by 4 transform operates on fourth adjacent signals of fourth adjacent rows of the twice-averaged signals presented to it. In the next alignment of the incoming stream of image signals, new sets of sixteen signals are presented to the respective transform networks. Every image signal therefore enters into sixteen transformation arrays in each stage (assuming one element displacement between overlapped blocks). As a result of the two stages of averaging, a large number of elements of the original image influence the reconstruction of each image element in the processed image.

Each transform network 74a, 74b and 74c transforms the image signals by the set of independent functions (characteristic of the Walsh-Hadamard transform) into a set of coefficient signals corresponding to combinations of image signals representative of smoothed light value and various image signal differences. (Smoothed light value is meant to include average, weighted average or other kinds of mean light values). The application of the sixteen arithmetic operations defined by the arrays of FIG. 4 represents this process for the 4 by 4 Walsh-Hadamard transform. These arithmetic operations generate the 4 by 4 matrix of coefficient signals $c_{ij}$. Sets of these coefficient signals are presented to respective clipping/removal circuits 76a, 76b and 76c, each of which have clipping levels chosen according to the expected noise levels (that is, noise as expressed in the transform coefficient signals conveyed through each of the stages). This being a clipping type of noise reduction process, coefficient signals less than the clipping levels—representing most of the noise—are passed unaffected to inverse transform networks 78a, 78b and 78c; coefficient signals greater than the clipping levels—representing most of the image information—are set to zero.

The results of the inverse transformation in the inverse transform networks 78a, 78b and 78c constitute sets of sixteen signal components $a'_{11} \ldots a'_{44}$ corresponding to the element locations a–p shown in FIGS. 6A, 6B and 6C respectively. These signal components are presented to respective assembly/averaging networks 80a, 80b and 80c in which the sixteen partial contributions due to block/block overlap in each stage are assembled by properly arranged delay elements and averaged together for each signal. The averaged signals (now predominantly noise) from each stage are then presented to the delay, alignment and summing network 82, which provides delays to compensate for the delays incorporated in the respective stages, aligns the signals and subtracts the signals (which are predominantly noise signals) produced by all three stages from the unmodified full-band signal presented on the line 68.

The present invention is an improvement upon a noise reduction method in which some of the coefficient signals subject to clipping will generate the artifact of "false edges" in smooth areas of the image. The improved method, which reduces these processing artifacts, is implemented principally in the circuits 76a, 76b and 76c by deemphasizing or suppressing certain of the transform coefficient signals generated by the direct transform networks 74a, 74b and 74c. (If the suppressed coefficient signals are actually set to zero, then there is no need to calculate them.) In accordance with the invention, the coefficient signals $c_{11}$, $c_{12}$, $c_{21}$ and $c_{22}$ resulting from the four arithmetic operations outlined in broken line 92 (FIG. 4) are set aside and not used during inversion. The specific coefficient signals selected for deemphasis or suppression will, if inverted by themselves, form a smoothed light value over an area smaller than the block they were removed from. For example, the coefficient signals generated by the operations in box 92 will, if inverted without the other twelve coefficient signals, generate an average light value over a 2 by 2 area within the 4 by 4 block. By removing these coefficient signals (generated by the operations in box 92) from the inversion process, the result after inversion of the remaining coefficient signals will be the difference between the light value of a particular image element and the average light value over an area (including that element) that is smaller than the area of the 4 by 4 block.

It is helpful in understanding this result to consider that each picture element is reconstructed in the inverse transform networks 78a, 78b and 78c by a predetermined combination of the coefficient signals $c_{ij}$, assigning negative contributions to some coefficient signals and positive contributions to others. It is also helpful to refer first to a non-overlapped transformation procedure. For example, in a nonoverlapped procedure, the image signal $a_{33}$ (third column of the third row) can be exactly regenerated (i.e., without clipping or coring) by summing the coefficient signals from all sixteen of the arithmetic operations, assigning A) positive polarities to signals $c_{11}$, $c_{14}$, $c_{22}$, $c_{23}$, $c_{32}$, $c_{33}$, $c_{41}$ and $c_{44}$ and B) negative polarities to the remaining eight signals. This combination yields the following 4 by 4 image element weighting pattern

| 0 | 0 | 0  | 0 |
|---|---|----|---|
| 0 | 0 | 0  | 0 |
| 0 | 0 | 16 | 0 |
| 0 | 0 | 0  | 0 |

If the signals from the arithmetic operations in broken line 92 are set aside, the following weighting pattern,

| 0 | 0 | 0  | 0  |
|---|---|----|----|
| 0 | 0 | 0  | 0  |
| 0 | 0 | 12 | -4 |
| 0 | 0 | -4 | -4 | oriented to a 2 by 2 image element area, will result. This amounts to a difference between the light value of the image element corresponding to image signal $a_{33}$ and the average light value over a 2 by 2 area including that element. Now, for example, if in addition to the removal of signals from the four operations in broken line 92 the coefficient signals $c_{24}$ and $c_{32}$ are removed by a coring or clipping procedure, the pattern will result.

| 0  | -2 | 2  | 0  |
|----|----|----|----|
| 2  | 0  | 0  | -2 |
| 0  | 2  | 10 | -4 |
| -2 | 0  | -4 | -2 |

Any other image signal is regenerated by a similar procedure. The benefit of the invention derives at least in part from the fact that the clipping or coring procedure operating over a 4 by 4 image field automatically includes elements outside of the smaller 2 by 2 area, which provides the result in the absence of such clipping or coring.

Considered from another point of view, elimination of the coefficient signals derived from the operations outlined in broken line 92 eliminates at least some of the coefficient signals that benefit least from an interrelationship of image gradients. In the case of a Walsh-Hadamard transform, the eliminated coefficient signals derive from arrays of weighting values (FIG. 4) with no more than one zero crossing in either or both the row or column directions (i.e., no more than one transition from positive to negative, or vice versa). Many, if not all, of the remaining coefficient signals have multiple zero crossings. In effect, they represent multiple inter-comparisons among many local gradients collected over an extended area. The clipping procedure thus is used on coefficient signals which represent an ensemble of local image gradient values summed over the larger area of the block. On the other hand, the eliminated coefficient signals represent image gradient values sensitive primarily to gradients extending across the block, without benefit from local variations occurring in the same area. By regenerating the image signals from the signals resulting from the remaining twelve coefficient operations (which were clipped in the circuits 76a, 76b and 76c and inverted in the networks 78a, 78b and 78c), the objectionable artifact of "false edges" is materially reduced compared to results obtained with the unimproved mode of noise reduction as described in the aforementioned Ser. No. 441,826.

Figure 8:
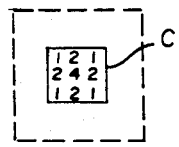
FIG. 8 is a diagram helpful in understanding the operation of FIG. 5 in accordance with the invention.

If the coefficient signals resulting from the four arithmetic operations outlined in broken line 92 (FIG. 4) are suppressed (or not calculated) and the remainder are processed in the preferred block overlap transformation procedure such as outlined in FIG. 5, the result obtained is different than for the non-overlapped case. FIG. 8 is helpful in understanding this result with regard to a single image element P within an image field A (which is repeated sixteen times for purpose of this illustration). Image signals from forty-nine image elements within the 7 by 7 image field A (a part of the total image) are processed in a series of sixteen overlapping 4 by 4 transformations, each including signals from sixteen image elements within a transform block B. The sixteen block positions B1 . . . B16 derive, for example, from the operation of the first stage 30 of FIG. 5. Due to block/block overlap, many of the resulting sixteen sets of transform coefficient signals share contributions from many of the image elements, and all sets share contributions from the common image element P. After inversion, the image element P will include sixteen partial contributions due to the sixteen 4 by 4 Walsh-Hadamard transformation blocks that overlap that element. By setting aside the signals resulting from the operations outlined in broken line 92 (FIG. 4), the result for each element after inversion and averaging (but without taking clipping into consideration) will be the difference between the light value of that particular element and the smoothed light value over a smaller 3 by 3 block C. The light value over the block C is equivalent to a weighted average obtained by convolving an array

| 1 | 2 | 1 |
|---|---|---|
| 2 | 4 | 2 |
| 1 | 2 | 1 | with the image signals from a 3 by 3 field of image elements centered over the image element P. When clipping is applied, as in the non-overlapped case for a 4 by 4 area, contributions from the broader 7 by 7 area will enter into the image result. This process (with clipping) is carried out, according to FIG. 5, for each new image element P in turn and yielding results having noticeably fewer processing artifacts such as "false edges."

In order to properly reconstruct the image without omitting some spatial frequency regions, the frequency space should be separated into substantially contiguous frequency segments (which ordinarily overlap to some degree). Each stage of a multi-stage transformation method would process one of these frequency segments. In the practice of the invention, the coefficient signals removed from each stage represent a smoothed light value over an area smaller than that being processed in that stage. It is a particular feature of the invention that these signals may be passed to a subsequent stage to provide the proper frequency segment for processing in that stage. Alternatively, the input signals to the subsequent stage may be prefiltered in such a manner as to provide the same segment of frequencies. In either case, the spatial frequencies are correctly separated among the stages.

The weighted average over the block C of FIG. 8 represents this particular feature of the invention in connection with a block overlap transformation method such as described in the aforementioned Ser. No. 441,826. This feature can be understood as follows. In practicing the invention, the coefficient signals left out in the first stage 30 of FIG. 5 are ordinarily set to zero. However, if these same coefficient signals—instead of being set to zero—were averaged and inverted by themselves with the remaining twelve coefficient signals set to zero, the result would represent a weighted average signal obtained by convolving an array

| 1 | 2 | 1 |
|---|---|---|
| 2 | 4 | 2 |
| 1 | 2 | 1 | with the image signals from a 3 by 3 field of image elements. It is therefore meaningful that in FIG. 5 the averaging prefilter 72b generates the same weighted average signal (in accordance with the averaging array of FIG. 7A) and presents this weighted average signal to the delay and alignment network 70b in the second stage 40. This means that the removal of the coefficient signals resulting from the operations outlined in broken line 92 (FIG. 4) provides the desired division of frequency space between the first and second stages of FIG. 5.

The same reasoning used in connection with FIG. 8 for the first and second stages can be used with respect to the second and third stages of the block overlap transformation method of FIG. 5. In this case the coefficient signals left out in the second stage 40 represent a weighted average signal obtained by convolving an array

| 1 | 0 | 2 | 0 | 1 |
|---|---|---|---|---|
| 0 | 0 | 0 | 0 | 0 |
| 2 | 0 | 4 | 0 | 2 |
| 0 | 0 | 0 | 0 | 0 |
| 1 | 0 | 2 | 0 | 1 | with signals from a 5 by 5 field of image elements centered over the image element P. This is the same weighted average signal as that provided by the averaging prefilter 72c in the third stage 50 of FIG. 5. The improved block overlap transformation method thus reduces the appearance of artifacts, such as "false edges", while at the same time providing an efficient method for separating the image frequencies among the several stages of the transformation method.

Figure 9:
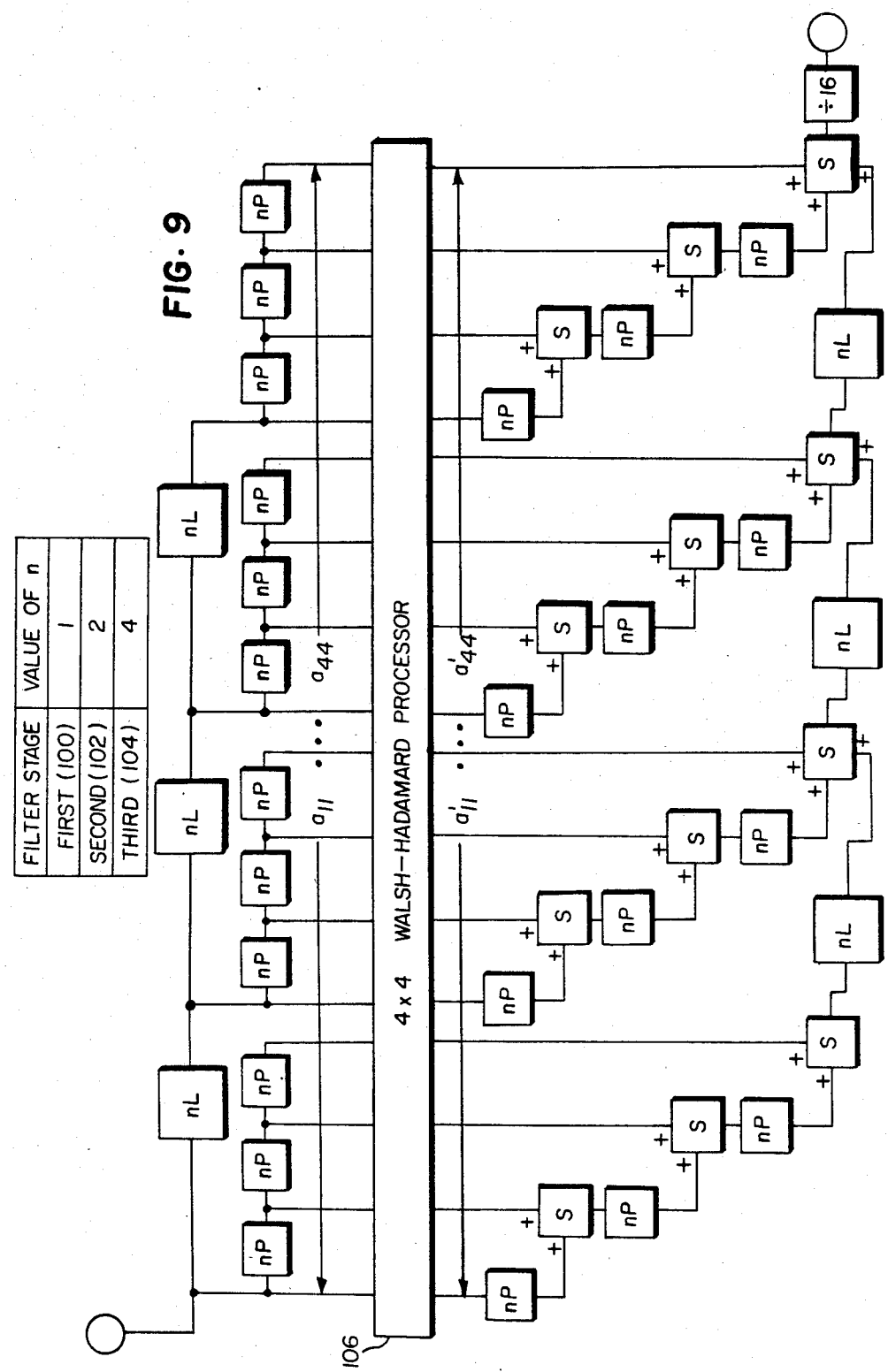
FIG. 9 is a generalized circuit diagram for implementing the first, second and third stage filters of FIG. 5.

A block overlap transformation method based on the processing of such selected transform coefficient signals may be implemented by application of conventional digital hardware or by suitable programming of a digital computer. Such digital circuit design or software programming is conventional and within the capability of one of ordinary skill in these arts, given the preceding descriptions of the method in accordance with the invention. One conventional implementation in digital hardware is described in relation to FIGS. 9-16. In this connection, portions of the block diagram of FIG. 5 constituting the respective filter stages are enclosed in broken lines. Henceforth, the box 100 will be referred to as the first stage 4 by 4 Walsh-Hadamard filter, the box 102 as the second stage 4 by 4 Walsh-Hadamard filter, and the box 104 as the third stage 4 by 4 Walsh-Hadamard filter. FIG. 9 illustrates a hardware implementation of the respective filter stages—with the assignment of n indicating which stage the hardware will implement. Regarding other portions of FIG. 5, the averaging prefilters 72b and 72c are provided by the delay and summing elements shown in FIGS. 10 and 11, respectively. The delay, alignment and summing network 82 is provided by the delay and summing elements connecting the configuraton of inputs shown in FIG. 12.

A number of similar components appear throughout the diagrams of FIGS. 9-16, as follows. Line and element delay units are specified by boxes that are labeled with an "L" or "P" respectively. Where appropriate, a multiple of "L" or "P" is specified in a single box to indicate a corresponding multiple unit delay. (In FIG. 9, the variable n signifies the multiplier for the delay. For the first stage, $n=1$; the second stage, $n=2$; and the third stage, $n=4$.) Summing points are specified by boxes that are labeled with an "S" and the prescribed signs of the inputs are specified by "+" or "−". Scaling operations are specified by boxes that are labeled with the division symbol "÷" followed by the particular divisor (i.e., scaling factor) employed in a specific operation. Moreover, the components for implementing the circuits described by FIGS. 9-16 are commonly obtained through ordinary supply sources. The choice of particular device types is well within the capability of those of ordinary skill in the electronics arts. Further device specification is believed unnecessary for practice of the method in accordance with the invention.

Figure 10:
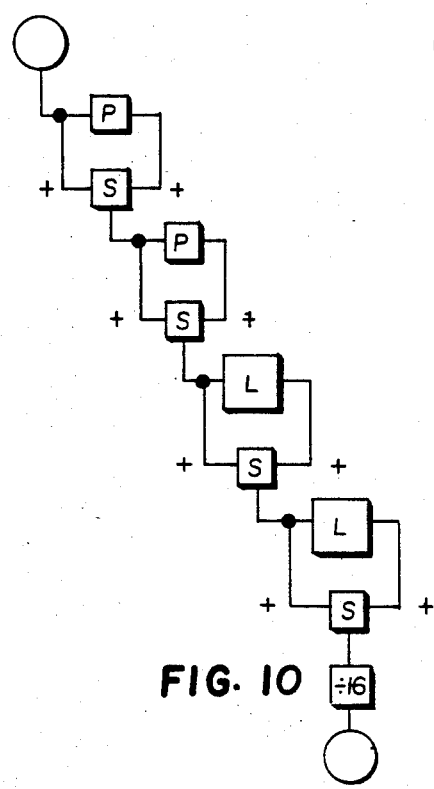
FIGS. 10 and 11 are circuit diagrams of the pair of averaging prefilters used in FIG. 5.
Figure 11:
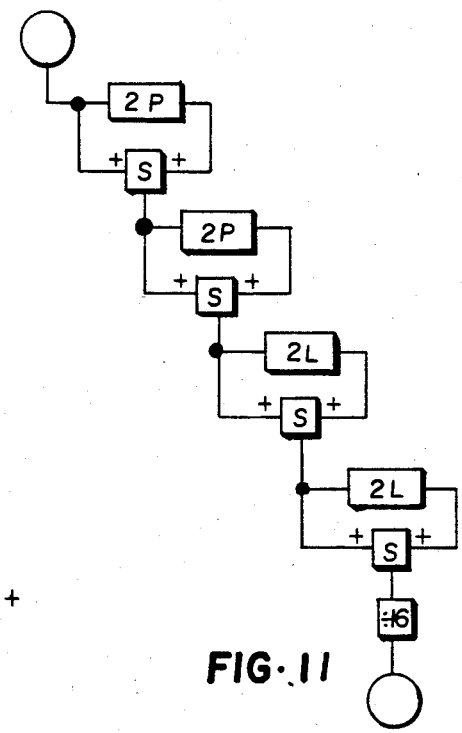

Referring concurrently to FIG. 5 and FIGS. 9-16, the stream of input image signals are presented simultaneously to the first stage 4 by 4 Walsh-Hadamard filter 100 (FIG. 9, $n=1$) and to the second stage averaging prefilter 72b (FIG. 10). The structure of delay, summing, and averaging units illustrated in FIG. 10 implements the averaging pattern of FIG. 7A. The resultant average is delivered to the second stage Walsh-Hadamard filter 102 (FIG. 9, $n=2$) and to the third stage averaging prefilter 72c (FIG. 11). The structure of delay, summing, and averaging units illustrated in FIG. 11 implements the averaging pattern of FIG. 7B. The resultant average is delivered to the third stage Walsh-Hadamard filter 104 (FIG. 9, $n=4$).

Figure 13:
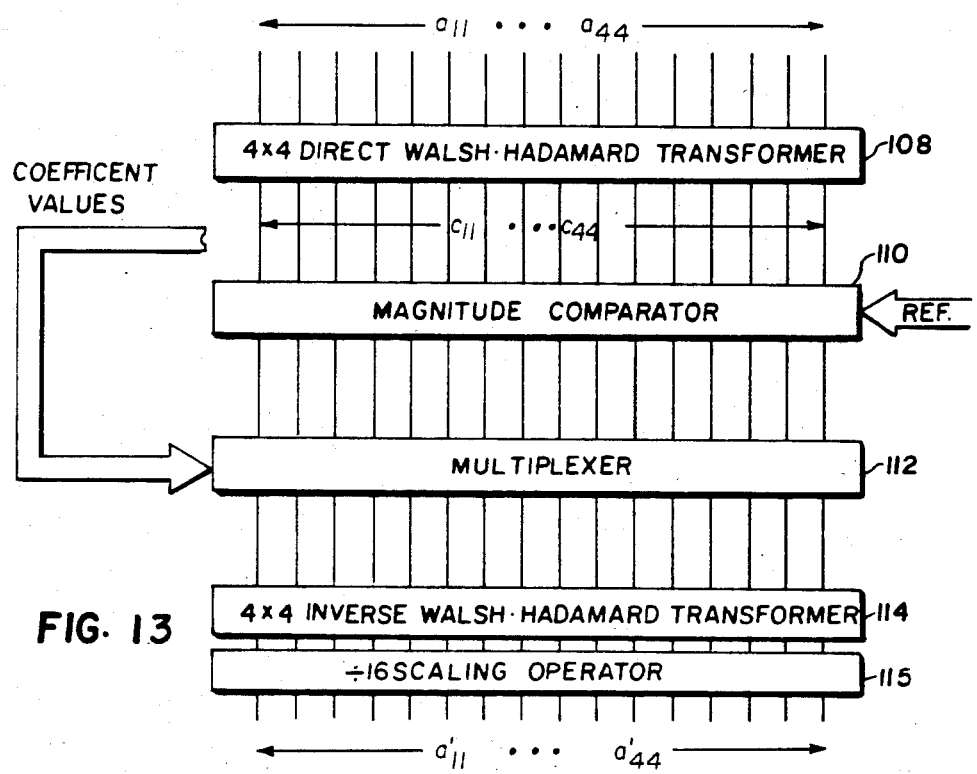
FIG. 13 is a circuit diagram of the Walsh-Hadamard processor incorporated in FIG. 9.

Each Walsh-Hadamard filter (FIG. 9) includes a 4 by 4 Walsh-Hadamard processor 106 which is shown in greater detail in FIG. 13. With reference to the components of FIGS. 5 and 9, each processor 106 includes (1) the direct transform network 74a, 74b or 74c (shown as a 4 by 4 direct Walsh-Hadamard transformer 108 in FIG. 13) (2) the clipping/removal circuits 76a, 76b or 76c (shown as a magnitude comparator 110 and a multiplexer 112 in FIG. 13) and (3) the inverse transform network 78a, 78b or 78c (shown as a 4 by 4 inverse Walsh-Hadamard transformer 114 in FIG. 13). The network of delay units preceding the processor 106 in the diagram of FIG. 9 corresponds to the respective delay and alignment network 70a, 70b or 70c utilized in the respective stages of the apparatus of FIG. 5. These delay units generate sixteen image signals $a_{11} \ldots a_{44}$ corresponding to the sixteen image element locations a–p selected for the Walsh-Hadamard transformation at each stage (as shown by FIGS. 6A, 6B and 6C). The network of delay and summing units following the processor 106 in the diagram of FIG. 9 corresponds to the respective assembly and averaging network 80a, 80b or 80c shown in FIG. 5.

Figure 14:
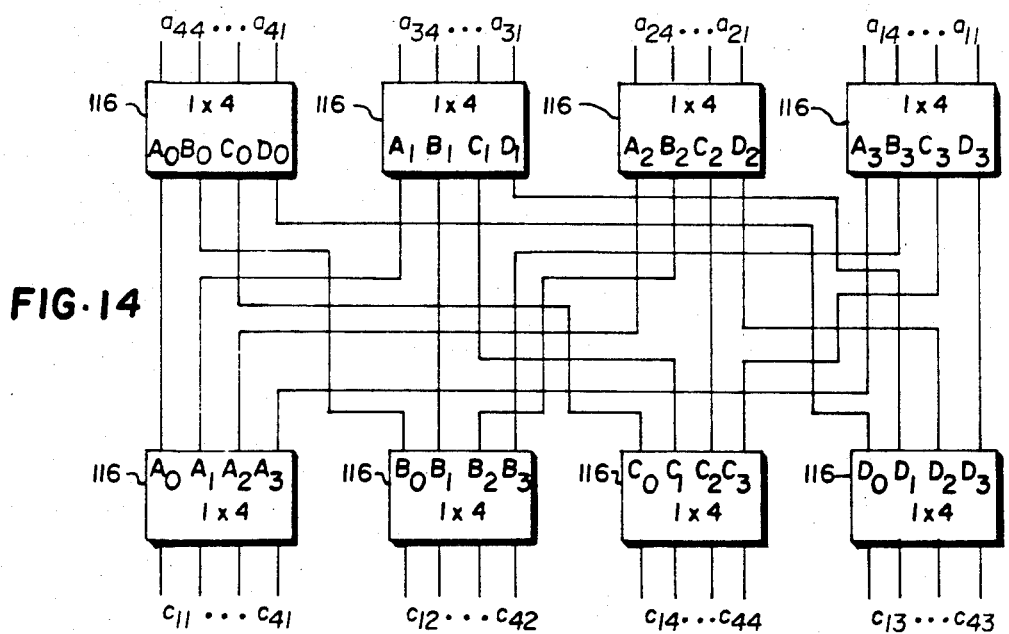
FIG. 14 is a circuit diagram of a configuration of 1 by 4 transformers for implementing the direct and inverse transformers of FIG. 13.
Figure 15:
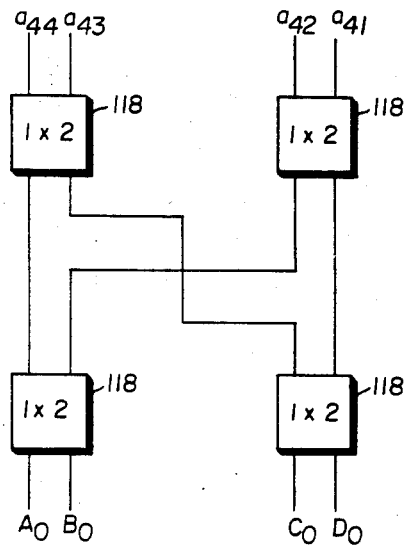
FIG. 15 is a circuit diagram of one of the 1 by 4 transformers incorporated in FIG. 14.
Figure 16:
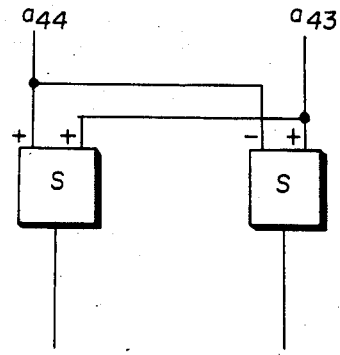
FIG. 16 is a circuit diagram of the summing components comprising each of the 1 by 2 transformers incorporated in FIG. 15.

Referring now to FIG. 13, the sixteen input image signals $a_{11} \ldots a_{44}$ are presented to the 4 by 4 direct transformer 108, which performs a Walsh-Hadamard transform on the input signals and generates sixteen transform coefficient signals $c_{11} \ldots c_{44}$. The direct transformer 108 employs a battery of 1 by 4 transformers 116 (FIG. 14) which take image signals in by row and put out coefficient signals by column. The schematic for a single 1 by 4 transformer operating on the first four image signals $a_{44} \ldots a_{41}$ is shown in FIG. 15 in which the required calculations are implemented by a set of 1 by 2 transformers 118, each of which is composed of a summing network shown in FIG. 16. The other 1 by 4 transformers of FIG. 14 are the same excepting the respective input and output lines.

Certain of the Walsh-Hadamard transform coefficient signals are compared to respective references in the magnitude comparator 110 (FIG. 13). If any of the coefficient signals have a value exceeding the corresponding reference, a bit is set to the multiplexer 112 causing the multiplexer 112 to set the corresponding coefficient signal to zero. Otherwise the input coefficient signals are switched to the 4 by 4 inverse transformer 114 without change. In accordance with the invention, four of the coefficient signals—those generated by the operations within the broken line box 92 of FIG. 4—are set to zero. (In this particular implementation, the four signals of FIGS. 13 or 14 that are set to zero are $c_{11}$, $c_{12}$, $c_{21}$ and $c_{22}$.) For the Walsh-Hadamard transform, the 4 by 4 inverse Walsh-Hadamard transformer 114 is constructed the same as the 4 by 4 transformer 108 with inputs now being the twelve modified coefficient signals. The modified image signals $a'_{11} \ldots a'_{44}$ are then divided by sixteen and presented to the network of delay and summing units following the processor 106 of FIG. 9. In this network, sixteen partial contributions due to block/block overlap are assembled by the arranged delay elements and averaged together for each image signal.

The second and third stage Walsh-Hadamard filters 102 and 104 are implemented with the same arrangement of digital devices as for the first stage, the only difference being that n is set to 2 and 4, respectively, to account for multiple delays in the networks preceding and succeeding the 4 by 4 Walsh-Hadamard processor 106 of FIG. 9.

Figure 12:
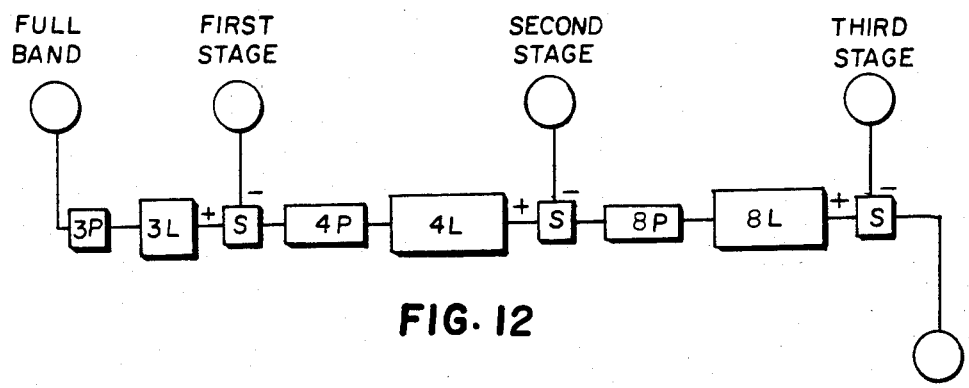
FIG. 12 is a circuit diagram of the delay, alignment and summing network utilized in FIG. 5 to receive the full-band signal and the signal ouput from the first, second and third stage filters.

The averaged signals (now predominantly noise) from each stage of FIG. 5 are presented to the delay, alignment and summing network 82, which provides delays to compensate for the delays incorporated in the respective stages, and aligns and subtracts the signals produced by the three stages from the unmodified full-band signal presented on the line 68. The configuration of delay and summing elements diagrammed in FIG. 12 provides the necessary delay, alignment and summing required by the network 82, if the full band signal and the output signals from the respective stages are connected as indicated.

Despite the beneficial results, there is a trade-off in using such a procedure in accordance with the invention. Low-contrast detail suffers in comparison to the output from a block overlap transformation method that includes all the coefficient signals (or excludes only the average coefficient signal $c_{11}$). Nonetheless, the advantages in reduction of unwanted artifact are worth the cost. However, a better compromise is obtained with a variation of the block overlap transformation method. In taking a 4 by 4 transform of the image signals, the preceding embodiment used the signal values of 4 successive (or spaced) elements of 4 successive (or spaced) lines of the original image. The described techniques of direct transformation and inverse transformation are still valid if the signal values are taken in a different scanning pattern.

More specifically, the sixteen signal values for the transformation operations are taken from the nine elements of a 3 by 3 array instead of the sixteen elements of a 4 by 4 array. For example, from the 3 by 3 array of elements

| i | h | g |
|---|---|---|
| f | e | d |
| c | b | a | a 4 by 4 array of signal values is specified by

| $i_1$ | $h_1$ | $h_1$ | $g_1$ |
|---|---|---|---|
| $f_1$ | $e_1$ | $e_1$ | $d_1$ |
| $f_1$ | $e_1$ | $e_1$ | $d_1$ |
| $c_1$ | $b_1$ | $b_1$ | $a_1$ | sampling (or storing and using) a, c, g and i once; b, d, f and h twice; and e four times. By applying the same weight of ±1 to each signal value as shown in the arithmetic operations of FIG. 4 and combining the weights for the elements used more than once, the sixteen operations illustrated in FIG. 4 are condensed into the sixteen "collapsed" arithmetic operations of FIG. 17.

Figure 18:
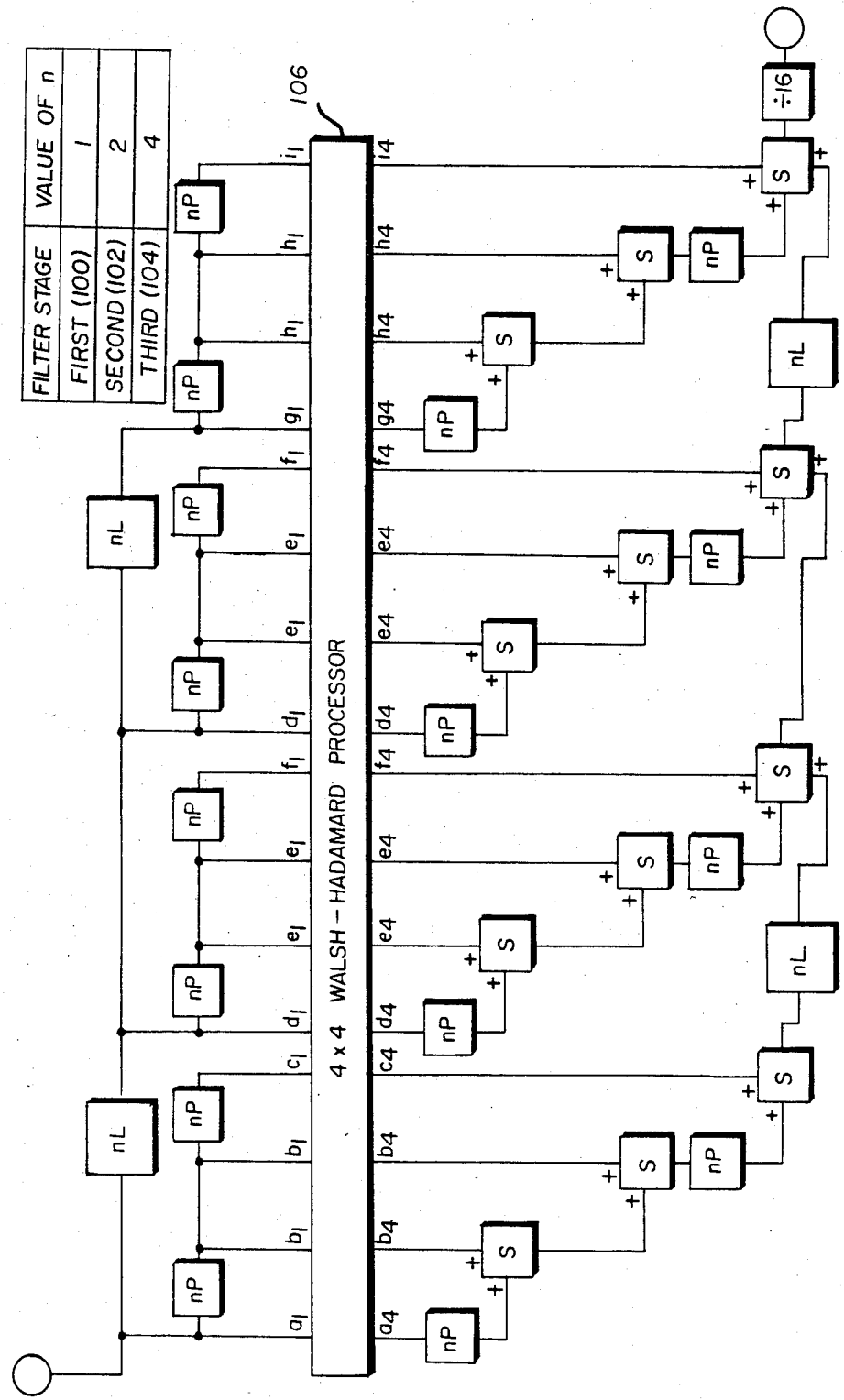
FIG. 18 is a generalized circuit diagram for implementing the first, second and third stage filters of FIG. 5 in accordance with the array of weights of FIG. 17.

Such a "3 by 3" transform is implemented in the three-stage block overlap transform method of FIG. 5 by substituting modified 4 by 4 Walsh-Hadamard filters for the first, second and third stage filters 100, 102, and 104. Each modified filter is implemented by the 4 by 4 Walsh-Hadamard processor 106 and a modified arrangement of delay and summing elements preceding and succeeding the processor 106, as shown by FIG. 18. The delay elements leading to the processor 106 assemble the signals resulting from the nine sampled elements into an array of sixteen signals, some of which are duplicated. The assignment of the number n (n=1, 2 or 4) corresponds to the particular stage being assembled, each stage sampling the image in accordance with the respective patterns of FIGS. 19A, 19B and 19C. The Walsh-Hadamard processor 106 is the same as discussed in connection with FIG. 9 excepting that the signals into and out of the processor circuit are connected as shown in FIG. 20. An incidental aspect of this collapsed version of the Walsh-Hadamard transform is that the input to the next stage can be taken directly from the transform coefficient signal representative of a smoothed average light value instead of from the respective averaging prefilter 72b or 72c (FIG. 5).

Figure 17:
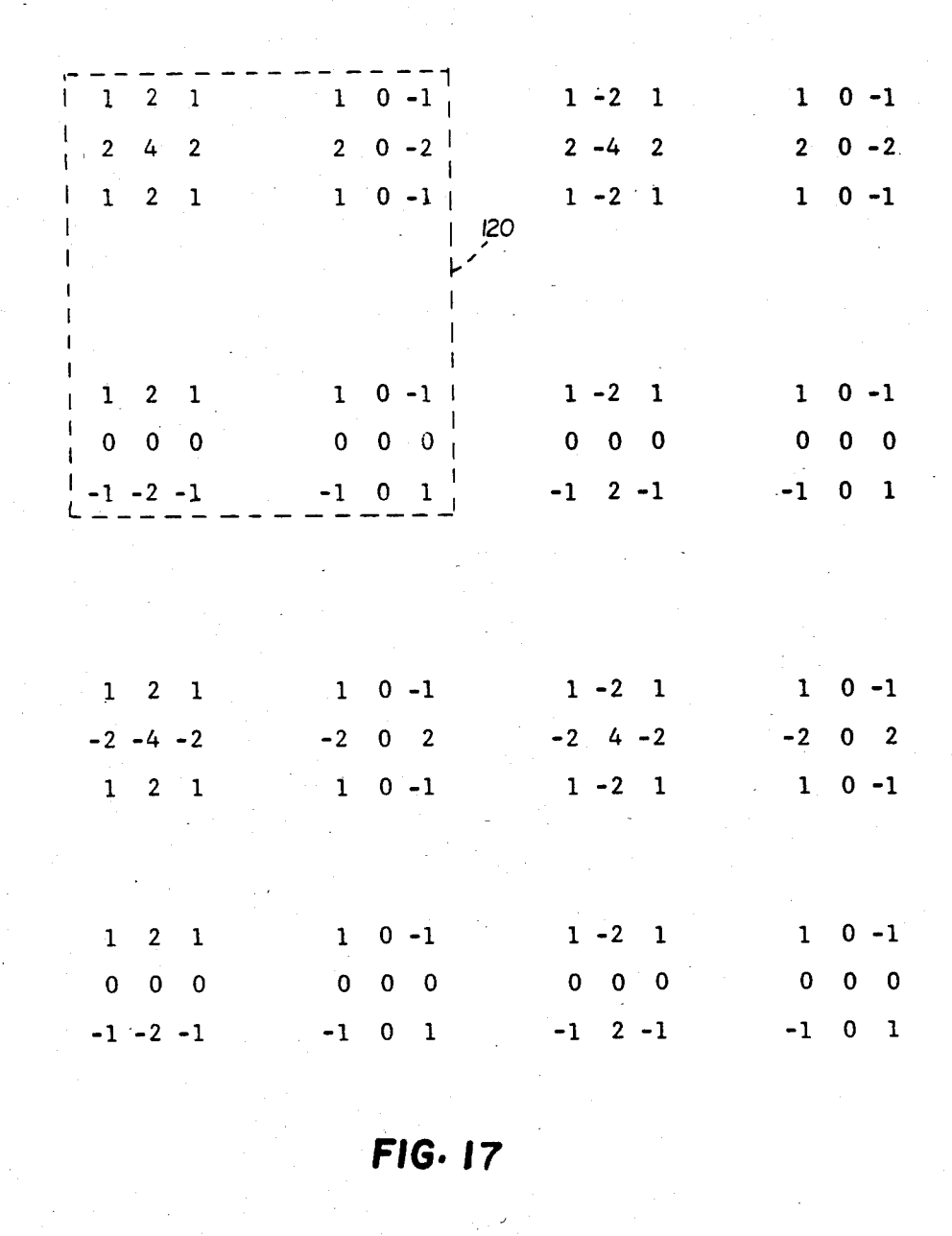

In accordance with the method of the invention, the coefficient signals derived from the four arithmetic operations within the box 120 (in broken line) in FIG. 17 are set to zero by the multiplexer 112 and do not enter into the inverse transformation by the transformer 114. It is to be noted that some of the remaining coefficient signals are derived from arithmetic operations that are the same as certain of those within the box 120; it is, of course, possible to take advantage of this redundancy in simplifying the circuits. The elimination of artifact is accomplished with lesser effect upon low contrast edges by a compromise, that is, by deemphasizing (i.e., by setting aside some, but not all, of) the signals derived from coefficients which, if absent from the inversion process, would lead to the desired interrelationship of image gradients. However, in common with the "uncollapsed" 4×4 Walsh-Hadamard transform, the remaining coefficient signals, after inversion, represent the difference between the light value of an image element and a smoothed light value over an area—including the element—smaller than the block being transformed. The delay and summing elements following the processor 106 assemble and average the sixteen partial contributions due to block/block overlap into an output image signal.

The 4 by 4 Walsh-Hadamard transform has been the only transform method considered in detail. The improvement, in accordance with the invention, is achieved by setting certain of the coefficient signals to zero, i.e., by eliminating their contributions in the linear combinations used to invert the image signal. Other transforms, such as the slant transform, involve different linear combinations in order to reconstruct each image element. The same improvement, in accordance with the invention, is achieved by deemphasizing certain of the coefficient signals, but not, as with the Walsh-Hadamard transform, setting all of them to zero. The remaining coefficient signals, including ones that are deemphasized, will have the effect after inversion—in common with the described usage of the Walsh-Hadamard transform—of generating the difference between an image element and an average over an area smaller than the area included in the transform. Coring or clipping these coefficient signals will—similar to the Walsh-Hadamard case-include contributions from image elements outside of the smaller area.

The invention has been described in detail with particular reference to presently preferred embodiments thereof, but it will be understood that variations and modifications can be effected within the spirit and scope of the invention.

What is claimed is:

1. A method of processing an image for noise reduction, comprising the steps of:
   generating image signals representative of the light value of elements of the image;
   forming the image signals into signal arrays each aligned to a group of image elements;
   transforming each array of image signals into a set of coefficient signals corresponding to combinations of image signals representative of a smoothed light value over an image region including said group of image elements and differences in light value within said group of image elements;
   selecting a subset of coefficient signals that represent differences in light value between elements of the image and a smoothed light value over an image region smaller than the area defined by said group of image elements;
   modifying one or more of the coefficient signals in said selected subset in order to reduce noise in the processed image; and
   generating a processed image of reduced noise from said modified subset of coefficient signals.

2. The method as claimed in claim 1 wherein the step of selecting a subset of coefficient signals comprises first excluding another subset of coefficient signals that represent said smoothed light value over said smaller image region and then utilizing the remaining coefficient signals as said selected subset of coefficient signals.

3. The method as claimed in claim 2 wherein the step of transforming comprises transforming each array of image signals by use of the Walsh-Hadamard transform.

4. The method as claimed in claim 3 wherein the excluded subset of coefficient signals represent first order differences between image signals.

5. The method as claimed in claim 4 wherein the selected subset of coefficient signals represent second or higher order, differences between image signals.

6. The method as claimed in claim 2 further comprising performing the foregoing steps in a hierarchy of separate stages in which the image signals generated for each stage subsequent to the first comprise signals equivalent to the coefficient signals excluded from the preceding stage.

7. The method as claimed in claim 1 wherein the step of forming the image signals into arrays of signals comprises forming the image signals into arrays of signals such that each array includes at least one image signal in common with at least one other array whereby the aligned arrays correspond to overlapping groups of image elements.

8. The method as claimed in claim 3 wherein the step of transforming by use of the Walsh-Hadamard transform comprises modifying the Walsh-Hadamard transform such that at least some of the combinations of image signals constituting the coefficient signals use more than one contribution from the same image signal.

9. A method of processing an image for noise reduction, comprising the steps of:
   generating image signals representative of the light value of elements of the image;
   transforming the image signals by a set of independent functions into coefficient signals corresponding to combinations of image signals representative of a summed light value and several differences in light value between image elements, including some coefficient signals representing first order difference and others representing second, or higher order, differences;
   modifying a set of coefficient signals representing the second or higher order differences so as to suppress noise in the processed image; and
   generating a processed image of reduced noise from the modified set of coefficient signals.

10. The method as claimed in claimed in claim 9 wherein the step of transforming comprises transforming the image signals by a set of independent functions characteristic of the Walsh-Hadamard transform.

11. The method as claimed in claim 9 further comprising performing the foregoing steps in a hierarchy of separate stages in which the image signals generated for each stage subsequent to the first comprise the equivalent of a set of the coefficient signals representing first order differences from the preceding stage.

12. A method of image processing for noise reduction especially arranged to process signals derived from gradients within an image, said method comprising the steps of:

generating image signals representative of the light value of elements of the image;

forming the image signals into signal arrays aligned to blocks of image elements;

transforming each array of image signals by a set of independent functions into a set of coefficient signals corresponding to combinations of image signals representative of image gradients, including some coefficient signals primarily representative of block-wide image gradients and others representative of combinations of semiblock-wide image gradients each locally contained within a partial area of each block;

processing the coefficient signals for noise reduction by (a) deemphasizing a set of the coefficient signals representative of said block-wide image gradients and (b) modifying another set of the coefficient signals representative of said combinations of semi-block-wide image gradients; and generating a processed image of reduced noise from the processed coefficient signals.

13. The method as claimed in claim 12 further comprising performing the foregoing steps in a hierarchy of separate stages in which the image signals generated for each stage subsequent to the first are representative of said block-wide image gradients from the preceding stage.

14. The method as claimed in claim 13 wherein the step of forming the image signals into signal arrays in each stage further comprises overlapping the signal arrays in each stage so as to correspond to overlapping blocks of image elements.

15. The method as claimed in claim 12 wherein at least some of the combinations of image signals constituting the coefficient signals include multiple contributions from the same image signal.

16. The method as claimed in claim 12 wherein the step of transforming the image signals comprises transforming the image signals by means of a Walsh-Hadamard transform of a 4 by 4 or larger size.

17. A method of image processing especially arranged to prevent the generation of unwanted artifacts during the processing of signals derived from gradients within an image, said method comprising the steps of:

generating image signals representative of the light value of elements of the image;

forming the image signals into signal arrays aligned to blocks of image elements;

transforming each array of image signals by a set of independent functions characteristic of the Walsh-Hadamard transform into a set of coefficient signals corresponding to combinations of image signals representative of (a) a block-wide smoothed light value and (b) image gradients, including some coefficient signals primarily representative of block-wide image gradients and others representative of intercomparisons among image gradients within each block;

removing from each set of coefficient signals the coefficient signal representative of the smoothed light value and at least some of the coefficient signals representative of block-wide image gradients;

modifying at least some of the remaining coefficient signals in each set by (a) comparing these remaining signals to one or more thresholds and (b) altering certain of these signals as a function of the comparison;

performing the foregoing steps in a hierarchy of separate stages in which the image signals generated for each stage subsequent to the first comprise signals equivalent to the coefficient signals removed from each set of coefficient signals in the preceding state; and generating processed image signals from the remaining coefficient signals, some of which are modified.

18. The method as claimed in claim 17 wherein the step of forming the image signals into signal arrays is implemented such that each array includes at least one image signal in common with at least one other array whereby the aligned arrays correspond to overlapping blocks of image elements.

19. A method of processing an image for noise reduction, comprising the steps of:

generating image signals representative of the light value of elements of the image;

forming the image signals into signal arrays each aligned to a group of image elements;

transforming each array of image signals into a set of coefficient signals corresponding to combinations of image signals that represent differences in light value between elements of the image and a smoothed light value over an image region smaller than the area defined by said group of image elements;

modifying one or more of the coefficient signals in order to reduce noise in the processed image; and generating a processed image of reduced noise from said modified coefficient signals.

20. The method as claimed in claim 19 wherein the step of transforming comprises transforming each array of image signals by use of the Walsh-Hadamard transform.

21. The method as claimed in claim 20 wherein the coefficient isgnals represent second or higher order, differences between image signals.

* * * * *

UNITED STATES PATENT OFFICE
CERTIFICATE OF CORRECTION

PATENT NO. : 4,553,165
DATED : November 12, 1985
INVENTOR(S) : Bryce E. Bayer

It is certified that error appears in the above-identified patent and that said Letters Patent are hereby corrected as shown below:

Column 8, line 53, delete "proceding" and insert ---preceding---

Column 18, line 55, delete "in claimed".

Column 20, line 51, delete "isgnals" and insert ---signals---.

Signed and Sealed this

Twenty-second Day of April 1986

[SEAL]

Attest:

DONALD J. QUIGG

Attesting Officer     Commissioner of Patents and Trademarks